US008811300B2

(12) United States Patent
Lin et al.

(10) Patent No.: US 8,811,300 B2
(45) Date of Patent: Aug. 19, 2014

(54) PHYSICAL STRUCTURE AND SEQUENCE DESIGN OF MIDAMBLE IN OFDMA SYSTEMS

(75) Inventors: Chih-Yuan Lin, Wujie Township, Yilan County (TW); Pei-Kai Liao, Nantou County (TW)

(73) Assignee: Mediatek Inc. (TW)

(*) Notice: Subject to any disclaimer, the term of this patent is extended or adjusted under 35 U.S.C. 154(b) by 939 days.

(21) Appl. No.: 12/655,524

(22) Filed: Dec. 30, 2009

(65) Prior Publication Data

US 2010/0165954 A1    Jul. 1, 2010

Related U.S. Application Data (60) Provisional application No. 61/141,814, filed on Dec. 31, 2008, provisional application No. 61/219,452, filed on Jun. 23, 2009.

(51) Int. Cl.
  *H04W 4/00* (2009.01)
(52) U.S. Cl.
  USPC .......... 370/329; 370/328; 370/310; 370/330; 455/450; 455/464; 455/509
(58) Field of Classification Search
  None
  See application file for complete search history.

(56) References Cited

U.S. PATENT DOCUMENTS

| | | | |
|---|---|---|---|
| 7,342,974 B2 | 3/2008 | Chiou | 375/260 |
| 7,417,974 B2 | 8/2008 | Hansen | 370/334 |
| 7,936,844 B2 | 5/2011 | Lai et al. | 375/316 |
| 7,961,806 B2 | 6/2011 | Lin et al. | 375/262 |
| 2003/0026223 A1 | 2/2003 | Eriksson et al. | 370/335 |
| 2003/0156594 A1 | 8/2003 | Trott et al. | 370/442 |
| 2004/0042429 A1* | 3/2004 | Kanterakis et al. | 370/335 |
| 2006/0094435 A1 | 5/2006 | Thomas et al. | 455/45 C |
| 2006/0269007 A1 | 11/2006 | Zhang et al. | 375/260 |

(Continued)

FOREIGN PATENT DOCUMENTS

| | | |
|---|---|---|
| CN | 1703852 A | 11/2005 |
| CN | 1870464 A | 11/2006 |

(Continued)

OTHER PUBLICATIONS

SIPO, the First Examination Opinion of Chinese patent application 200980100964.0, dated Apr. 1, 2012. (6 pages).

(Continued)

*Primary Examiner* — Anez Ebrahim
(74) *Attorney, Agent, or Firm* — Imperium Patent Works; Zheng Jin (57) ABSTRACT

In wireless OFDMA systems, midamble is used to facilitate downlink (DL) channel estimation. Midamble signals are transmitted by a base station via a midamble channel allocated in a DL subframe. In a novel symbol-based midamble channel allocation scheme, a midamble channel is allocated in the first or the last OFDM symbol of multiple resource blocks of the subframe, while the remaining consecutive OFDM symbols are used for data transmission. The symbol-based midamble channel provides good coexistence between midamble signals and pilot signals without inducing additional limitation or complexity. Under a novel midamble channel and sequence arrangement, both code sequence and either time-domain or frequency-domain location degrees-of-freedom are considered such that the required number of midamble sequences is substantially smaller than the number of strong interferences. In addition, different midamble sequences are systematically generated based on a base sequence such that the receiving mobile station does not need to memorize all the different code sequences.

18 Claims, 12 Drawing Sheets

(56) References Cited

U.S. PATENT DOCUMENTS

| | | | |
|---|---|---|---|
| 2007/0064666 A1* | 3/2007 | Kwun et al. | 370/343 |
| 2007/0149249 A1 | 6/2007 | Chen et al. | 455/561 |
| 2007/0171808 A1 | 7/2007 | Wu et al. | 370/208 |
| 2007/0217539 A1* | 9/2007 | Ihm et al. | 375/267 |
| 2007/0230373 A1 | 10/2007 | Li et al. | 370/267 |
| 2008/0165881 A1* | 7/2008 | Tao et al. | 375/267 |
| 2008/0253279 A1* | 10/2008 | Ma et al. | 370/206 |
| 2009/0011767 A1* | 1/2009 | Malladi et al. | 455/450 |
| 2009/0041087 A1 | 2/2009 | Yamasuge | 375/130 |
| 2009/0067377 A1* | 3/2009 | Talukdar et al. | 370/329 |
| 2009/0122777 A1 | 5/2009 | Tao et al. | 370/343 |
| 2009/0122839 A1* | 5/2009 | Luo et al. | 375/145 |
| 2009/0225721 A1 | 9/2009 | Cudak et al. | 370/330 |
| 2009/0274226 A1 | 11/2009 | Mondal et al. | 375/260 |
| 2009/0316811 A1 | 12/2009 | Maeda et al. | 375/26 C |
| 2010/0035555 A1* | 2/2010 | Bala et al. | 455/63.1 |
| 2011/0002293 A1* | 1/2011 | Yuk et al. | 370/329 |
| 2011/0255451 A1 | 10/2011 | Moon et al. | 370/280 |
| 2011/0261806 A1* | 10/2011 | Chun et al. | 370/342 |
| 2012/0213178 A1 | 8/2012 | Mizusawa | 370/329 |
| 2013/0077469 A1* | 3/2013 | Ma et al. | 370/210 |

FOREIGN PATENT DOCUMENTS

| | | |
|---|---|---|
| CN | 101162987 A | 4/2008 |
| CN | 101272593 A | 9/2008 |
| CN | 101494528 A | 7/2009 |
| JP | 2007134804 | 5/2007 |
| JP | 2007251747 | 9/2007 |
| JP | 200872706 | 3/2008 |
| TW | 200420054 A | 10/2004 |
| TW | 200611519 A | 4/2006 |
| TW | 200737806 A | 10/2007 |
| TW | 200814593 A | 3/2008 |
| TW | 200832977 A | 8/2008 |
| WO | WO2008120925 A1 | 3/2007 |
| WO | WO2007053954 | 5/2007 |
| WO | WO2007098450 | 8/2007 |
| WO | WO2008042865 | 4/2008 |
| WO | WO2008050467 | 5/2008 |
| WO | WO2009125946 A2 | 10/2009 |
| WO | WO2009137268 | 11/2009 |

OTHER PUBLICATIONS

The USPTO has prepared the office action for related U.S. Appl. No. 12/655,523 dated Sep. 14, 2012(24 pages).

JP Office Action for related JP application 2011542663 dated Oct. 9, 2012(4 pages).

Translation of JPOA for related JP application 2011542663 dated Oct. 9, 2012(6 pages).

IEEE C802.16m-08/1071r2, Proposed SDD Text for UL Control, Dongsheng Ye et al., Sep. 17, 2008(8 pages).

IEEE C802.16m-08835, Sounding Channel Design Proposal, Bishwarup Mondal et al., Jul. 14, 2008(8 pages).

IEEE C802.16m-08/008, Proposed Frame Structure for IEEE 802.16m, Mark Cudak et al., Jan. 16, 2008(14 pages).

IEEE C802.16m-08/471, Uplink Control Structure, Xin Chang et al., May 5, 2008, pp. 21-23(14 pages).

IEEE 802.16m-08/003r6, IEEE 802.16m System Description Document, Shkimbin Hamiti et al., Dec. 12, 2008, p. 108 (3 pages).

IEEE C802.16m-08/615,Proposal for Uplink Mimo Schemes in IEEE 802.16m, Jun Yuan et al., Jul. 7, 2008, pp. 1-8 (9 pages).

IEEE 5802.16m-08/120r1, Proposal for IEEE 802.16m Downlink Symbol Structure Concept, Yuval Lomnitz et al., Mar. 12, 2008, pp. 23,24 (4 pages).

International Search Report and Written Opinion of International Search Authority for PCT/CN2009/076338 dated Apr. 8, 2010 (10 pages).

International Search Report and Written Opinion of International Search Authority for PCT/CN2009/076316 dated Apr. 15, 2010 (11 pages).

SIPO, the Examination Opinion of Chinese patent application 200980101045.5 dated May 28, 2013(5 pages).

MIMO Tecknowledge and Application, Tao Huang et al. 2007(3 pages).

Taiwan Intellectual Property Office has prepared the Examination Opinion of Taiwan patent application 098146381, dated Apr. 19, 2013. (6 pages).

R1-063128, Ericsson, "Uplink reference Signals", Nov. 6-10, 2006, Riga, Latvia (5 pages).

R1-070860, NTT DOCOMO et al. "Closed Loop Antenna Switching in E-Ultra Uplink", Feb. 12-16, 2007, St. Louis, USA (3 pages).

IEEE C802.16m-08/087, S Moon, JS Kwak, et al. "Frame Structure for IEEE 802.16", Jan. 16, 2008 (18 pages).

IEEE C802.16m-08/657r2, IEEE 802.16 Broadband Wireless Access Working Group, M Ho, J Pi et al. Jul. 7, 2008 (12 pages).

IEEE C802.16m-08/349, Dongsheng Yu et al. "Proposal for IEEE 802.16m Uplink Sounding Pilot", May 5, 2008 (12 pages).

IEEE 802.16m-08/943, Fred Vook et al. "Details of UL Channel Sounding Design for Section 11.9 of the SDD", Sep. 5, 2008 (12 pages).

IEEE C802.16m-08/1106r3, Shu Wang et al. "Enhance Downlink Positioning in WimAX/16m", Sep. 5, 2008 (17 pages).

IEEE C802.16m-08/243r1, Sungho Moon et al. "Frame Structures for Legacy-Support and Legacy-Support Disabled Modes", Mar. 17, 2008 (11 pages).

IEEE 802.16m-Sep. 0047, Ron Murias, "System Evaluation Details for IEEE 802.16 IMT-Advanced Proposal", Sep. 23, 2009. (p. 26 line 3-5. p. 31 line 64-65. p. 32 Fig.15 line 52. p. 33 line 1-6 Fig.16).

EPO, office action, EP09836092 dated Jan. 10, 2013 (19 pages).

EPO, office action, EP09836083 dated Jan. 10, 2013 (15 pages).

SIPO, Examination Search Report, 200980101045.5 dated Feb. 5, 2013 (9 pages).

Taiwan IPO, Examination Search Report, 098146374, dated Feb. 6, 2013 (8 pages).

JP office action, JP2011-542663 dated Feb. 12, 2013 (10 pages).

JP office action, JP2011-542661 dated Feb. 5, 2013 (9 pages).

* cited by examiner (PRIOR ART)
FIG. 1

(PRIOR ART)
FIG. 2

1 MIDAMBLE FOR STREAM 1
2 MIDAMBLE FOR STREAM 2
3 MIDAMBLE FOR STREAM 3
4 MIDAMBLE FOR STREAM 4

| 1 | MIDAMBLE FOR STREAM 1
| 2 | MIDAMBLE FOR STREAM 2
| 3 | MIDAMBLE FOR STREAM 3
| 4 | MIDAMBLE FOR STREAM 4
| 5 | MIDAMBLE FOR STREAM 5
| 6 | MIDAMBLE FOR STREAM 6
| 7 | MIDAMBLE FOR STREAM 7
| 8 | MIDAMBLE FOR STREAM 8

METHOD OF MIDAMBLE CHANNEL ALLOCATION AND TRANSMISSION IN AN OFDMA SYSTEM

PHYSICAL STRUCTURE AND SEQUENCE DESIGN OF MIDAMBLE IN OFDMA SYSTEMS

CROSS REFERENCE TO RELATED APPLICATIONS

This application claims priority under 35 U.S.C. §119 from U.S. Provisional Application No. 61/141,814, entitled "UL and DL Sounding Channel Designs," filed on Dec. 31, 2008; U.S. Provisional Application No. 61/219,452, entitled "Midamble Sequence Arrangement Methods for OFDMA Systems," filed on Jun. 23, 2009; the subject matter of which is incorporated herein by reference.

TECHNICAL FIELD

The disclosed embodiments relate generally to wireless network communications, and, more particularly, to midamble physical structure and sequence design in orthogonal frequency division multiple access (OFDMA) transmission systems.

BACKGROUND

Figure 1:
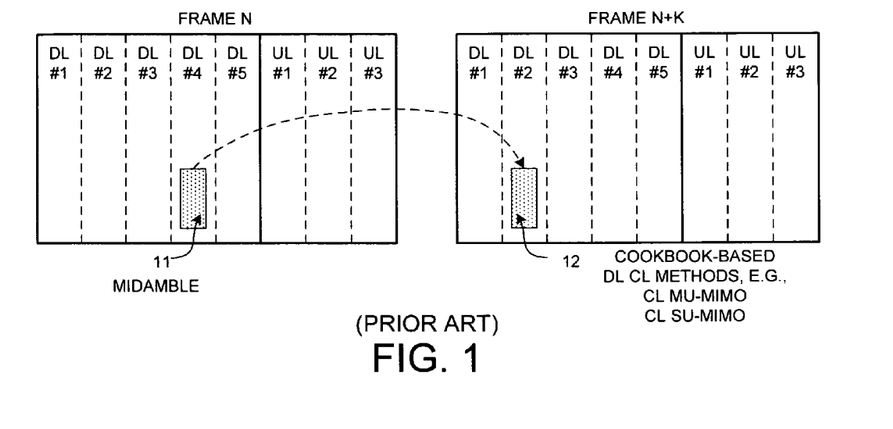
FIG. 1 (Prior Art) illustrates how downlink (DL) midamble is used for DL close-loop (CL) transmission.

In Orthogonal Frequency-Division Multiple Access (OFDMA) systems, midamble is a type of measurement pilot that allows a mobile station to obtain channel knowledge between the mobile station and a base station. Midamble transmission is a downlink (DL) signaling mechanism where a base station transmits midamble signals on the downlink to enable the mobile station to estimate base station to mobile station channel response. In one example, the mobile station can use channel knowledge obtained from the received midamble signals to choose the best precoding vector/matrix and then feedback the information back to the base station. In another example, the mobile station can use the channel information to calculate channel quality indicator (CQI) for a specific frequency band. FIG. 1 (Prior Art) illustrates how DL midamble is used for DL close-loop (CL) transmission. In the example of FIG. 1, the base station transmits midamble signals via a midamble channel 11 allocated in DL subframe DL#4 of frame N. The mobile station receives the midamble signals and performs DL channel estimation on the DL channel. In a subsequent frame N+K, the base station transmits data via a data channel 12 in DL subframe DL#2 using cookbook-based DL CL methods such as CL MU-MIMO or CL SU-MIMO.

Figure 2:
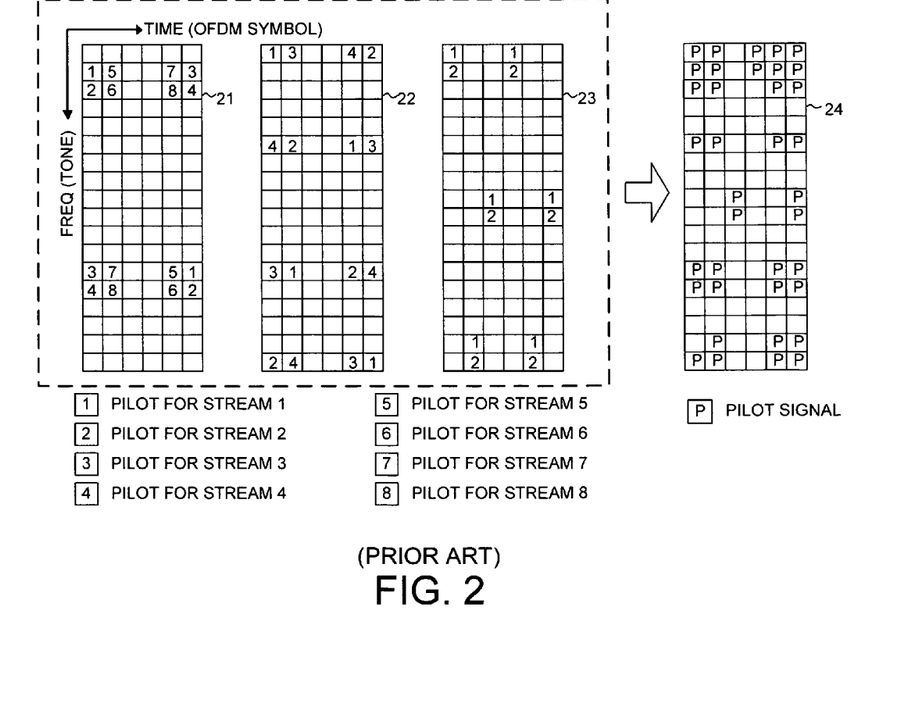
FIG. 2 (Prior Art) illustrates examples of different pilot patterns for different MIMO schemes in 18×6 resource blocks.

In IEEE 802.16m systems, a resource block is defined as a two-dimensional radio resource region comprising a number of consecutive sub-carriers (also referred as frequency tones) by a number of consecutive OFDM symbols (also referred as time slots). For both DL and uplink (UL) transmissions, the IEEE 802.16m specification defines various resource blocks such as 5-symbol resource block, 6-symbol resource block, and 7-symbol resource block to be used in various wireless systems. The IEEE 802.16m specification also defines corresponding pilot patterns for various MIMO schemes in each type of resource blocks. FIG. 2 (Prior Art) illustrates examples of different pilot patterns for different MIMO schemes in 6-symbol resource blocks. Resource block 21 is an 18×6 resource block with 8-stream localized pilot pattern, resource block 22 is an 18×6 resource block with 4-stream localized pilot pattern, and resource block 23 is an 18×6 resource block with 2-stream localized/distributed pilot pattern.

To ensure channel estimation quality, midamble signals transmitted via a midamble channel are not allowed to collide with the original pilots that are allocated in various DL resource blocks. Because different base stations may use any of the predefined pilot patterns for data transmission using the same resource block, the midamble channel must not overlap with any of the predefined pilot patterns. As illustrated in FIG. 2, after combining all the predefined pilot patterns, resource regions denoted with letter "P" represent all possible pilot signals transmitted in resource block 14 by different antennas of a base station.

Figure 3A:
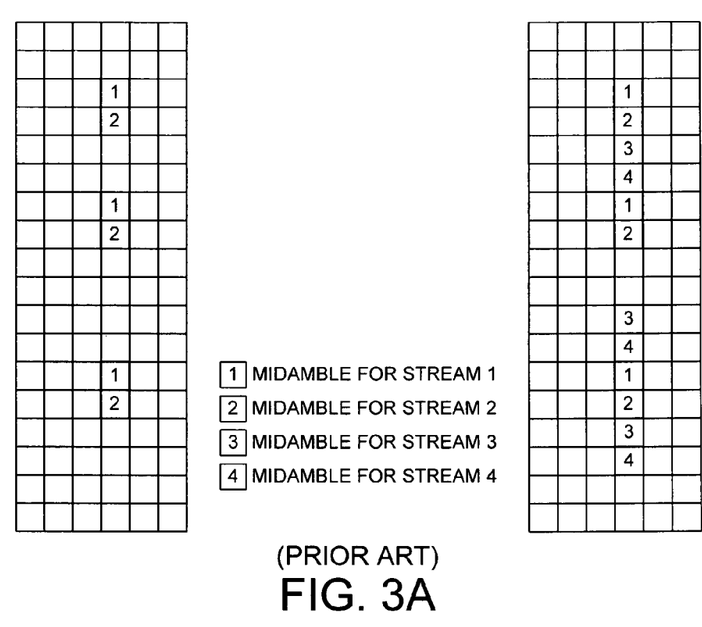
FIGS. 3A to 3C (Prior Art) illustrate examples of different midamble channel patterns for different MIMO schemes.
Figure 3B:
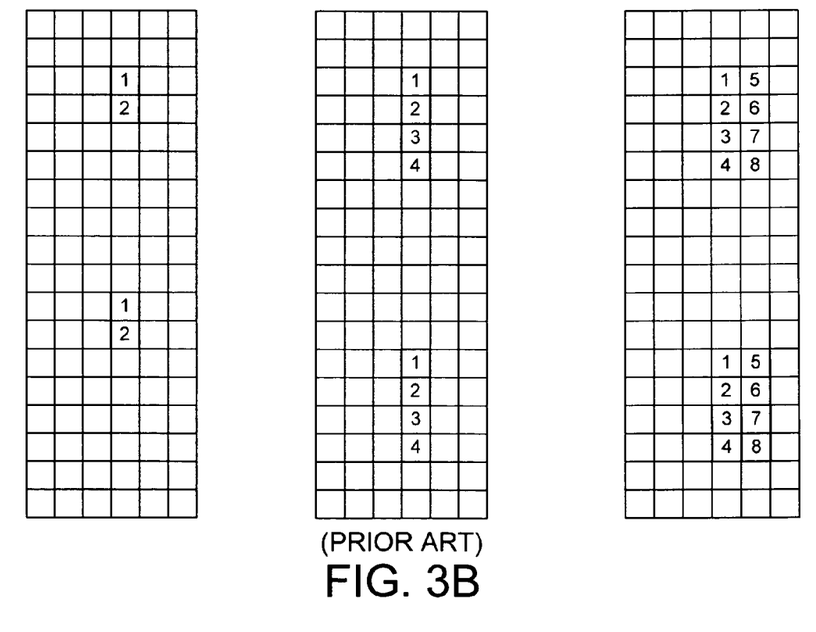
Figure 3C:
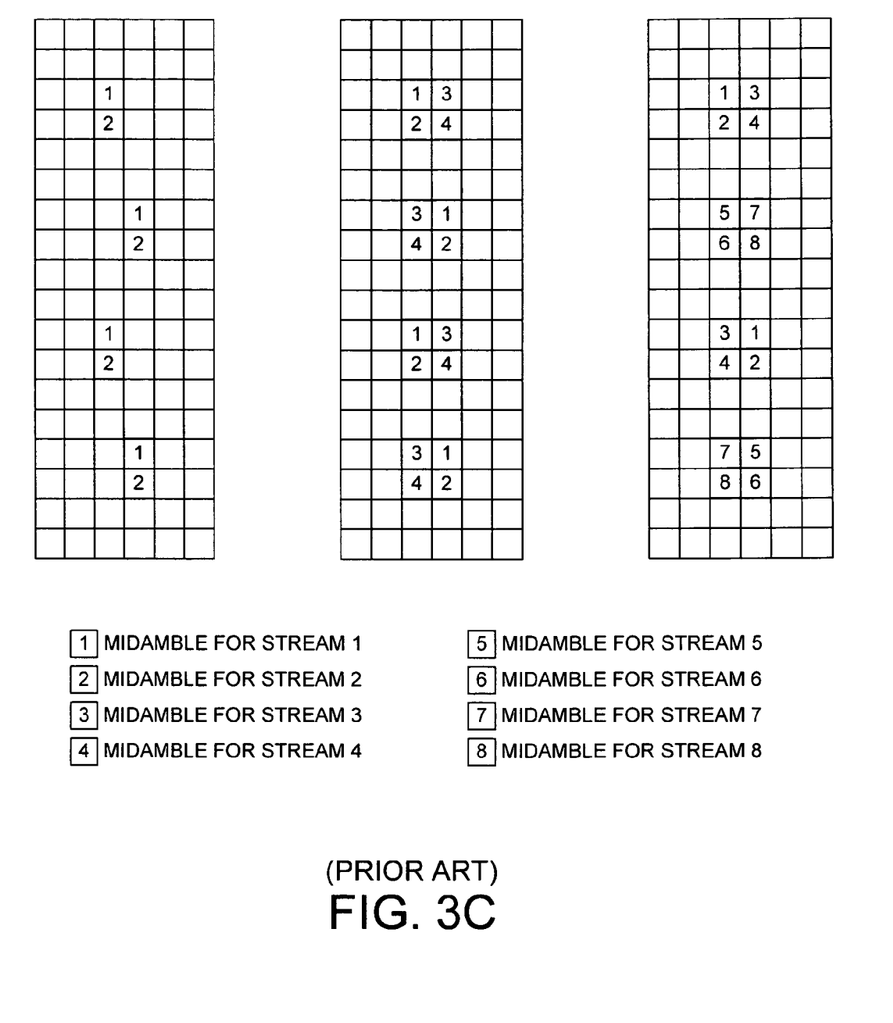

FIGS. 3A to 3C (Prior Art) illustrate examples of different midamble channel patterns allocated for different MIMO schemes. FIG. 3A illustrates midamble channel allocations for 2Tx and 4Tx MIMO cases. FIG. 3B illustrates midamble channel allocations for 2Tx, 4Tx, and 8Tx MIMO cases. Similarly, FIG. 3C illustrates different midamble channel allocations for 2Tx, 4Tx, and 8Tx MIMO cases. It can be seen that none of the allocated midamble channels overlap with any of the predefined pilot patterns. Such midamble channel allocation scheme, however, adds undesirable complexity to system implementation. First, each MIMO scheme is associated with a different midamble pattern. This requires base stations and mobile stations to memorize different data mapping rules when applying different MIMO schemes. Second, data and midamble signals co-exist in an OFDM symbol. As a result, it is difficult to control peak-to-average power ratio (PAPR) of the OFDM symbol and thus difficult to determine midamble power boosting.

In addition to the above-described complexity problems associated with midamble channel allocation, other issues arise from midamble sequence design. In existing IEEE 802.16e systems, there are 144 cell IDs defined for base stations located in different cells of an OFDMA system. Each of the 144 cell IDs is assigned to a different midamble sequence for midamble transmission to achieve interference randomization and robust midamble sequence detection for the mobile stations. Each mobile station, however, has to memorize all 144 midamble sequences. To support future network growth (i.e., future femtocell deployment), there are 768 cell IDs defined in current IEEE 802.16m systems. It is no longer feasible to use 768 midamble sequences for each of the 768 cell IDs. A solution is sought.

SUMMARY

In wireless OFDMA systems, midamble is used to facilitate downlink (DL) channel response estimation. Midamble signals are transmitted by a base station via a midamble channel allocated in multiple resource blocks of a DL subframe. In a novel symbol-based midamble channel allocation scheme, a midamble channel is allocated in the first or the last OFDM symbol of the multiple resource blocks of the DL subframe, while the remaining consecutive OFDM symbols of the same resource blocks are used for data transmission. The symbol-based midamble channel design provides good coexistence between midamble signals and pilot signals without inducing additional limitation or complexity.

First, midamble signals transmitted in the first or last OFDM symbol do not collide with any pilot signals transmitted in the remaining OFDM symbols. Second, the midamble pattern does not affect data transmission behavior of other base stations using the same resource block. For example, midamble signals occupy the entire first or last OFDM symbol do not limit SFBC-based data transmissions in the remaining OFDM symbols. Third, the midamble pattern is consistent among different MIMO schemes within each resource block such that base stations and mobile stations do not need to implement additional data mapping rules. In addition, because no data is mixed with midamble in the first or the last OFDM symbol, it is easier to design midamble sequences and determine midamble power boost in a way to minimize Peak-to-Average Power Ration (PAPR) for the first or the last OFDM symbol. Thus, the symbol-based midamble channel allocation scheme naturally satisfies all midamble channel design considerations using existing IEEE 802.16m system definition without inducing additional limitation and complexity.

Under a novel midamble channel and sequence arrangement, both code sequence and either time-domain location or frequency-domain location degrees-of-freedom are considered such that the required number of midamble sequences is substantially smaller than the number of strong interferences. The number of different midamble sequences required in an OFDMA system depends on the number of dominant neighboring cells (i.e., the number of cells causing strong interferences) and either the number of time-domain locations (i.e., OFDM symbols) or the number of frequency-domains (i.e., non-overlapping subcarrier sets) for midamble channel allocation in each frame.

Moreover, different midamble sequences are systematically generated based on a base sequence such that the receiving mobile station does not need to memorize all the different code sequences. In a first embodiment, a code sequence is generated by cyclically shifting the base sequence. The number of bits to be shifted for each generated sequence by a base station might depend on the Cell_ID of the base station. In a second embodiment, a code sequence is generated by separation-and-combination (SC) operation on the base sequence. The SC rule for each generated sequence by a base station might depend on the Cell_ID of the base station. In a third embodiment, a code sequence is generated by pseudo-randomly interleaving the base sequence. The interleaving rule for each generated sequence by a base station might depend on the Cell_ID of the base station.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 4:
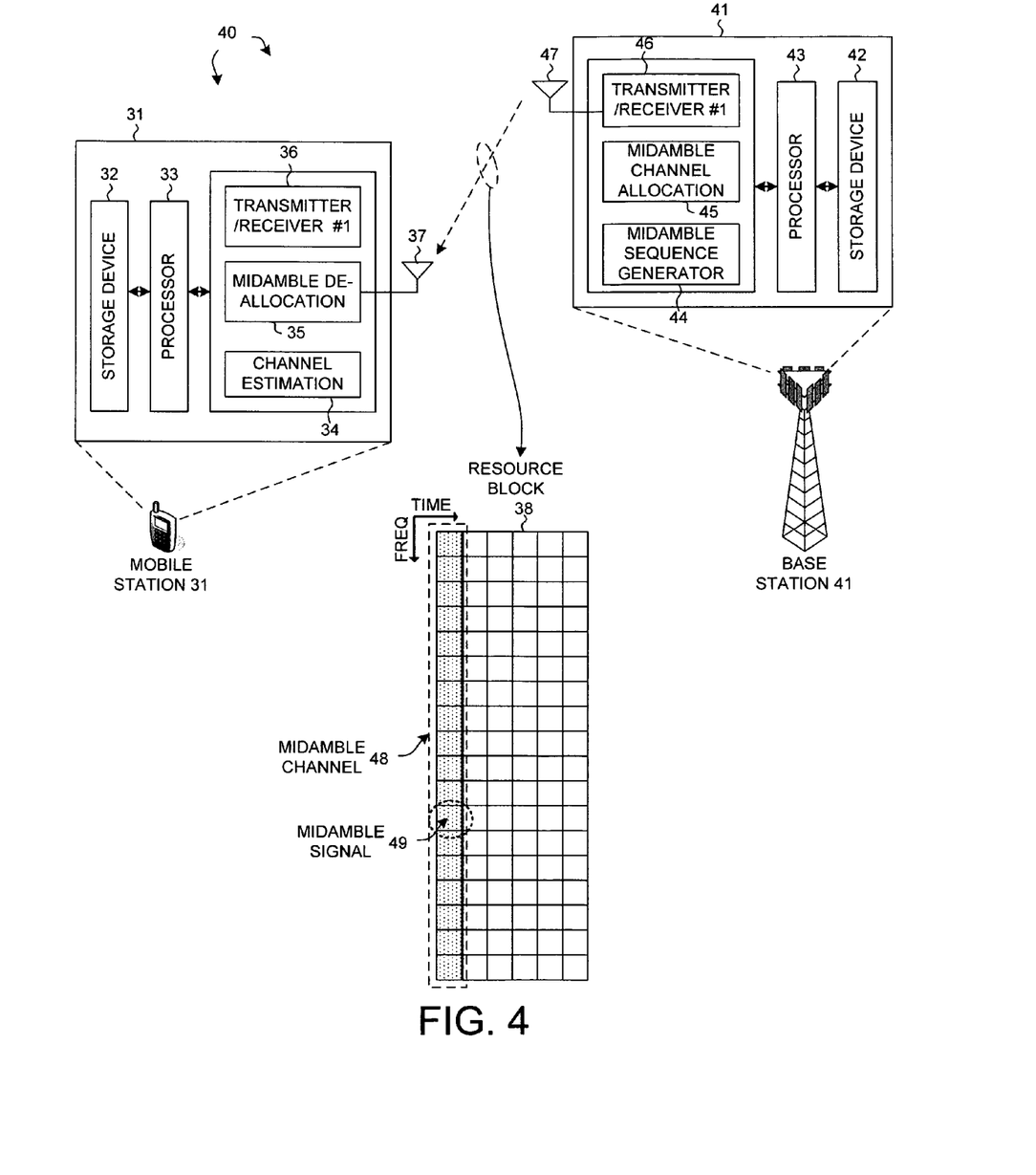
FIG. 4 illustrates a wireless OFDMA system with downlink midamble channel allocation and transmission in accordance with one novel aspect.

FIG. 4 illustrates a wireless OFDMA system 40 with midamble channel allocation and transmission in accordance with one novel aspect. Wireless OFDMA system 40 comprises a mobile station MS31 and a base station BS41. For downlink (DL) transmission, MS31 comprises a storage device 32, a processor 33, a channel estimation module 34, a midamble de-allocation module 35, and a transmitter and/or receiver 36 coupled to an antenna 37. Similarly, BS41 comprises a storage device 42, a processor 43, a midamble sequence generator 44, a midamble channel allocation module 45, and a transmitter and/or receiver 46 coupled to an antenna 47. For downlink (DL) channel estimation, base station BS41 transmits midamble signals carried by a midamble channel 48 allocated in a resource block 38 (or multiple resource blocks) in a DL subframe. Resource block 38 is a two-dimensional radio resource region comprising a number of consecutive subcarriers (i.e., eighteen) along frequency domain and a number of consecutive OFDM symbols (i.e., six) along time domain.

In the example of FIG. 4, midamble channel 48 is allocated in the first OFDM symbol within resource block 38. The number of subcarriers of midamble channel 48 allocated in resource block 38 is equal to the number of subcarriers (i.e., eighteen) of the resource block. A midamble sequence is then mapped onto midamble channel 48 to be transmitted as a plurality of midamble signals via resource block 38. Each midamble signal (i.e., midamble signal 34) occupies one frequency tone. Typically, the length of a midamble sequence is the same as the number of subcarriers of a resource block, and the number of midamble signals carried in a midamble channel is thus the same as the number of subcarriers of the resource block. In general, however, a midamble channel spans over multiple resource blocks such that longer midamble sequences should be used. For details described below with accompanying drawings, midamble channel 48 is allocated with a midamble pattern such that midamble signals transmitted in resource block 38 by BS41 do not collide with pilot signals transmitted in the same resource block. The midamble pattern also does not affect data transmission behavior using the same resource block 38. Furthermore, the midamble pattern reduces undesirable complexity of base station BS41 and mobile station MS31.

Figure 5:
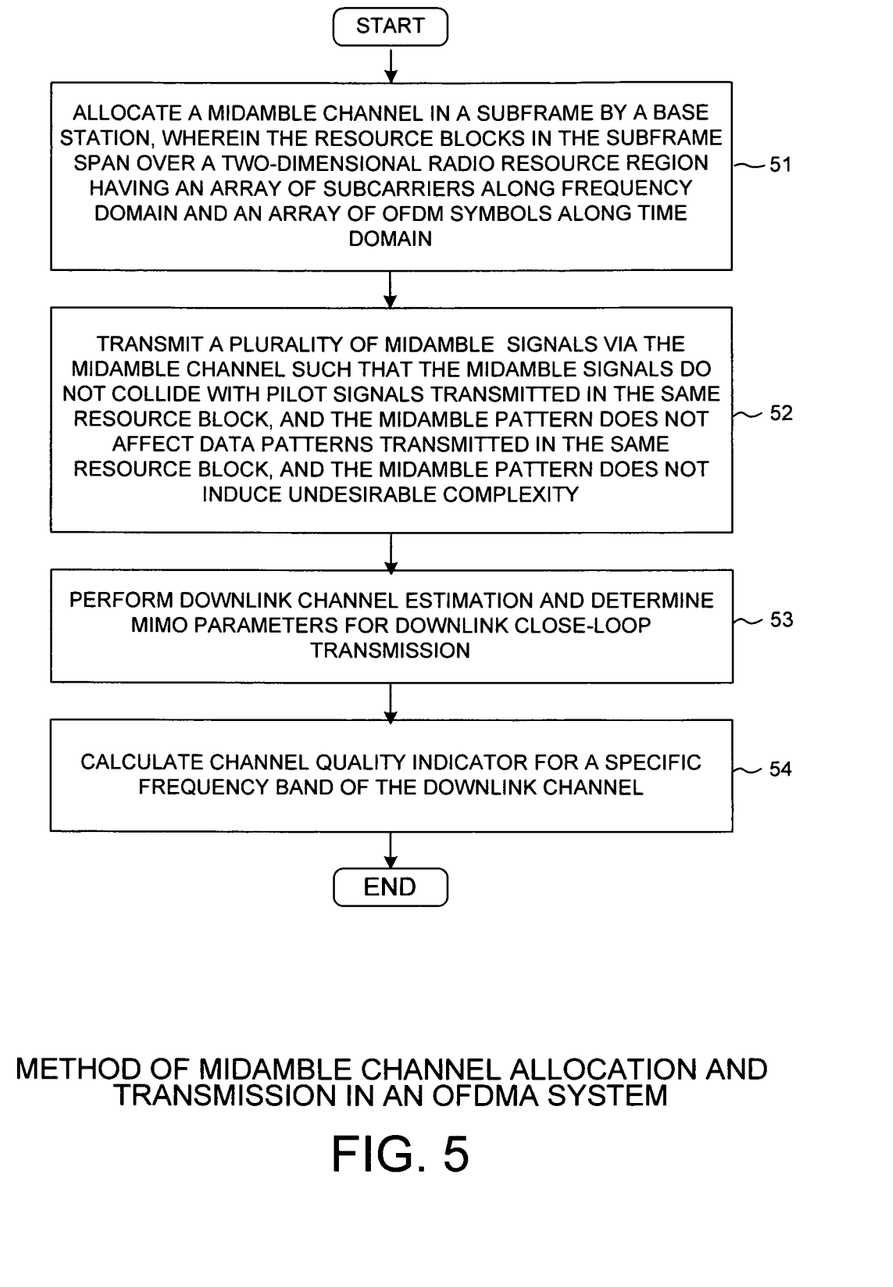
FIG. 5 is a flow chart of a method of downlink midamble channel allocation and transmission in accordance with one novel aspect.

FIG. 5 is a flow chart of a method of downlink midamble channel allocation and transmission in accordance with one novel aspect. In step 51, a base station allocates a physical midamble channel structure in multiple resource blocks in a DL subframe. In step 52, the base station maps a midamble sequence onto the allocated midamble channel to be transmitted as a plurality of midamble signals via the DL subframe. After the mobile station receives the midamble signals, the mobile station de-allocates the received midamble channel and then performs DL channel estimation for DL close-loop transmission (Step 53). For example, the mobile station can use obtained channel knowledge to choose the best precoding vector/matrix and then feedback the information to the base station. In addition, the mobile station can use the channel information to calculate channel quality indicator (CQI) for a specific frequency band of the downlink channel (step 54).

A well-designed midamble channel meets several important midamble channel design considerations. First, in order to provide high quality channel estimation for data transmission, midamble signals are not allowed to collide with original pilots transmitted in the same resource blocks. Second, it is desirable that midamble pattern does not affect data transmission behavior using the same resource blocks. Third, it is also desirable that midamble pattern consistency among different MIMO schemes within each resource block is maximally maintained such that mobile stations do not need to implement additional data mapping rules. Moreover, it is desirable to be able to minimize Peak-to-Average Power Ration (PAPR) for each OFDM symbol in each resource block.

Figure 6:
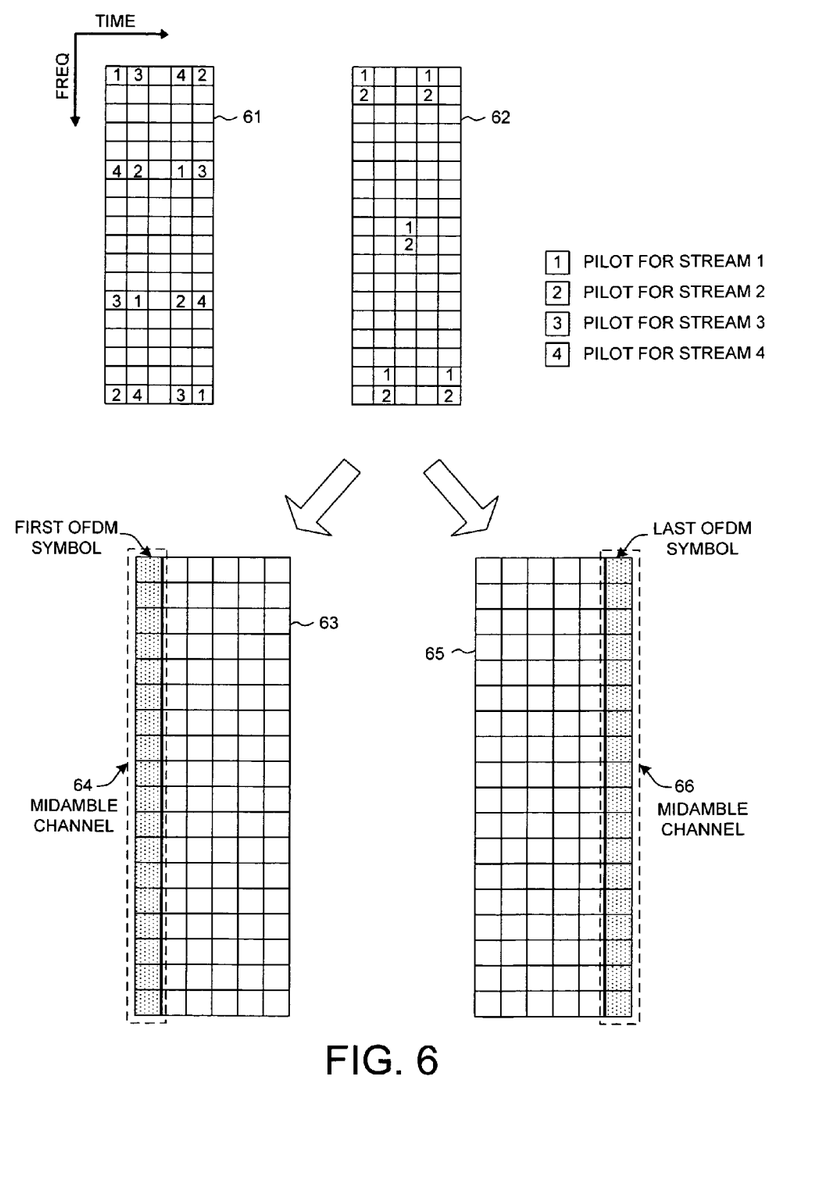
FIG. 6 illustrates one embodiment of a symbol-based midamble channel allocation scheme.

FIG. 6 illustrates one embodiment of a symbol-based midamble channel allocation scheme to satisfy the above-described midamble channel design considerations. As explained in the background section, the IEEE 802.16m specification has predefined different pilot patterns in 6-symbol resource blocks (type-1). A type-1 resource block is the basic resource block that is most commonly used in IEEE 802.16m systems. In some scenarios, however, the first OFDM symbol of the first DL subframe is often used for synchronization channel, and the last OFDM symbol of the last UL subframe is often used for receive/transmit transition gap (RTG). As a result, a 5-symbol resource block is actually used for data transmission. To facilitate data transmission using 5-symbol resource blocks, the IEEE 802.16m specification has also predefined different pilot patterns in various 5-symbol resource blocks (type-3). Two examples of 5-symbol resource blocks 61 and 62 with different pilot patterns are depicted in FIG. 6. Resource block 61 is an 18×5 resource block with 4-stream localized pilot pattern. Similarly, resource block 62 is an 18×5 resource block with 2-stream localized pilot pattern.

Based on the existing well defined resource block types and pilot patterns in IEEE 802.16m specification, it is observed that if a midamble channel is allocated in the first or the last OFDM symbol of a 6-symbol resource block, then all midamble channel design considerations are naturally satisfied if a corresponding 5-symbol resource block is used for data transmission. In the example of 18×6 resource block 63 of FIG. 6, midamble channel 64 is allocated in the first OFDM symbol. In the example of 18×6 resource block 65 of FIG. 6, midamble channel 66 is allocated in the last OFDM symbol. When midamble is enabled, if a base station uses midamble channel 64 or 66 to transmit midamble signals, then the remaining five consecutive OFDM symbols are formed to be a 5-symbol resource block to be used for data transmission. On the other hand, when midamble is disabled, the base station continues to use 6-symbol resource blocks for data transmission.

By allocating a midamble channel in either the first or the last OFDM symbol of a 6-symbol recourse block and using the remaining 5-symbol resource block for data transmission, all midamble channel design considerations are naturally satisfied without introducing additional limitation or complexity. First, midamble signals transmitted in the first or last OFDM symbol do not collide with any pilot signals transmitted in the remaining OFDM symbols. Second, the midamble pattern does not affect data transmission behavior using the same resource block. For example, Space Frequency Block Coding (SFBC) encoding algorithm may be applied for data transmission to achieve spatial diversity using multiple transmitting antennas. Because midamble signals occupy the entire first or last OFDM symbol, it does not limit SFBC-based data transmissions in the remaining OFDM symbols. Third, the midamble pattern is consistent among different MIMO schemes within each resource block such that mobile stations do not need to implement additional data mapping rules. In addition, because no data is mixed with midamble in the first or the last OFDM symbol, it is easier to design midamble sequences and determine midamble power boost in a way to minimize Peak-to-Average Power Ration (PAPR) for the first or the last OFDM symbol.

Figure 7A:
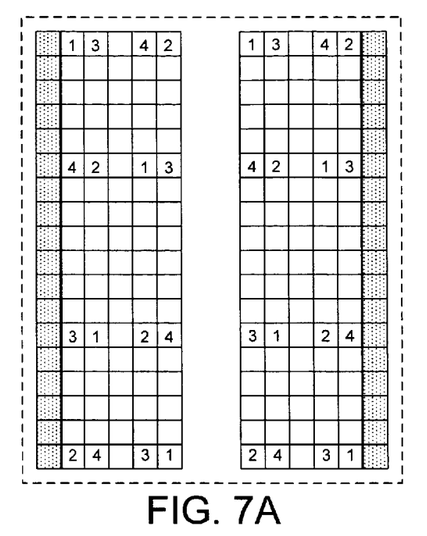
FIGS. 7A to 7D illustrate examples of symbol-based midamble channels allocated in 6-symbol resource blocks with various pilot patterns.
Figure 7B:
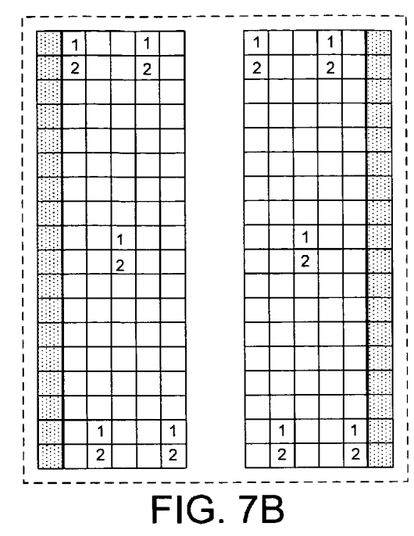
Figure 7C:
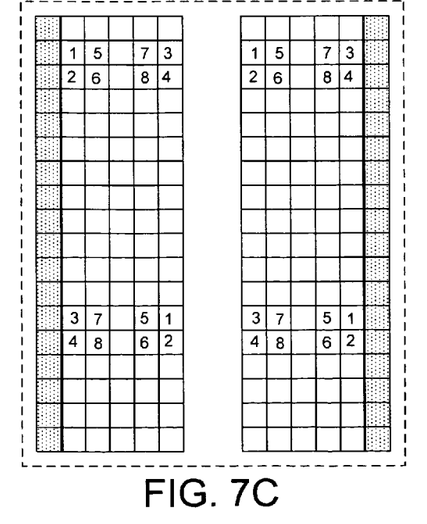
Figure 7D:
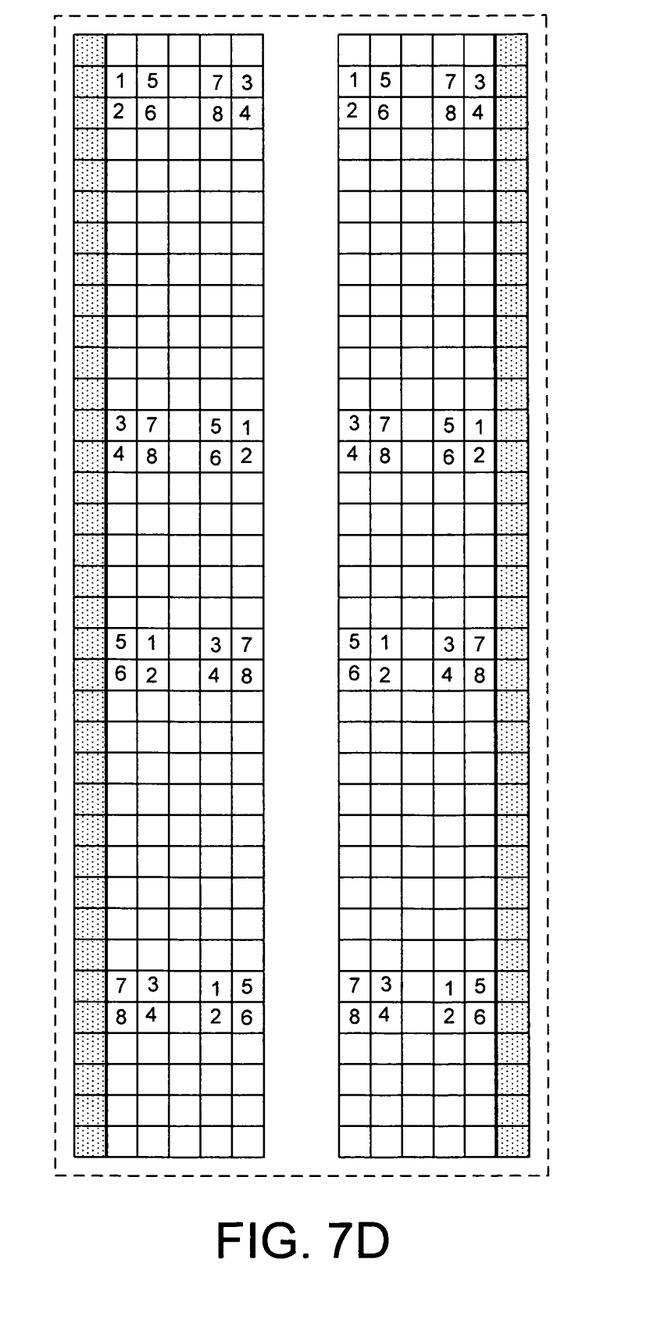

FIGS. 7A to 7D illustrate examples of symbol-based midamble channels allocated in resource blocks having various predefined pilot patterns. In FIG. 7A, an 18×6 resource block with 4-stream localized pilot pattern is used for both midamble signals and data transmission. In FIG. 7B, an 18×6 resource block with 2-stream localized/distributed pilot pattern is used for both midamble signals and data transmission. In FIG. 7C, an 18×6 resource block with 8-stream localized pilot pattern is used for both midamble signals and data transmission. In FIG. 7D, a 36×6 resource block with 8-stream localized pilot pattern is used for both midamble signals and data transmission. In all the above examples, it can be seen that because midamble channels are allocated in either the first OFDM symbol or the last OFDM symbol, and pilot signals and data are transmitted in the remaining consecutive OFDM symbols. Because 5-symbol pilot patterns and data-mapping rules are already well defined in IEEE 802.16m specification, such symbol-based midamble channel allocation scheme always allows good coexistence of midamble and pilot signals, without inducing any additional limitation on data transmission behavior or additional complexity on mobile station implementation.

Figure 8:
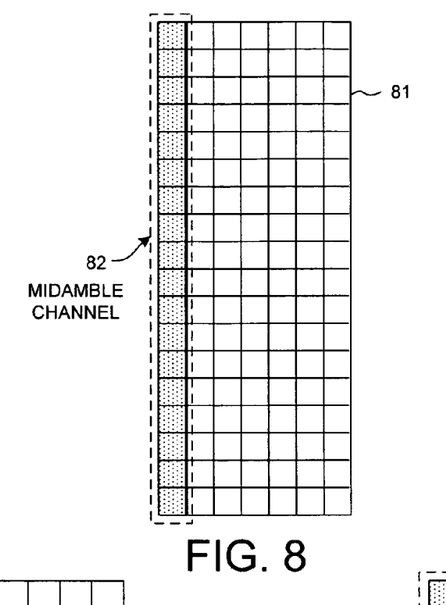
FIG. 8 illustrates that the symbol-based midamble channel allocation scheme can be expanded to 7-symbol resource blocks.

FIG. 8 illustrates that the symbol-based midamble channel allocation scheme can be easily expanded to 7-symbol resource blocks. In an 18×7 resource block 81, which exists in IEEE 802.16m systems with 7 MHz and 8.75 MHz bandwidths, a midamble channel 82 is allocated in either the first (or the last OFDM symbol, not shown in FIG. 8) for transmitting midamble signals, while the remaining six consecutive OFDM symbols are formed to be a 6-symbol resource block for data transmission. This further illustrates that the symbol-based midamble channel allocation scheme provides good coexistence of midamble and pilot signals based on existing 802.16m system definition without inducing additional limitation and complexity.

Figures 9A, 9B:
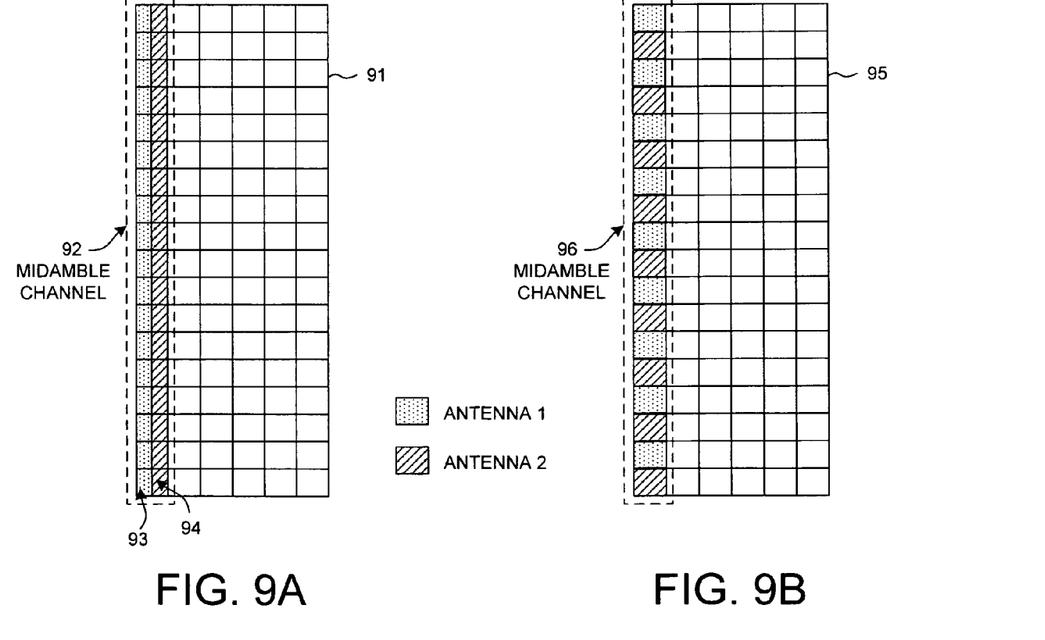
FIGS. 9A to 9B illustrate a midamble channel shared by different antennas by Code Division Multiplexing (CDM) and/or Frequency Division Multiplexing (FDM).

An allocated midamble channel may be shared by different antennas of a base station using Code Division Multiplexing (CDM) and/or Frequency Division Multiplexing (FDM). FIG. 9A illustrates that a midamble channel 91 allocated in resource block 91 is shared by antenna 1 and antenna 2 of a base station using CDM. In the example of FIG. 9A, antenna 1 of the base station maps a midamble sequence 93 onto midamble channel 92, while antenna 2 of the base station maps a different midamble sequence 94 onto midamble channel 92. By using different midamble sequences, the same resource region of a midamble channel can be shared by multiple antennas to transmit midamble signals. FIG. 9B illustrates that a midamble channel 96 allocated in resource block 95 is shared by antenna 1 and antenna 2 of a base station using FDM. In the example of FIG. 9B, antenna 1 of the base station maps a midamble sequence onto part of the subcarriers (i.e., subcarriers 1, 3, 5, ...) within midamble channel 96, while antenna 2 of the base station maps the same midamble sequence onto a different part of the subcarriers (i.e., subcarriers 2, 4, 6, ...) within midamble channel 76. By using different subcarriers of a midamble channel, the midamble channel can be shared by multiple antennas to transmit midamble signals.

In other embodiments, a midamble channel can also be shared by two different base stations using a combination of CDM and/or FDM. Each of the two base stations has only one antenna to be used for midamble transmission. If using CDM, the antennas of the two base stations use different midamble sequences to transmit midamble signals. If using FDM, the antennas of the two base stations use different sets of non-overlapping subcarriers to transmit midamble signals.

Figure 10:
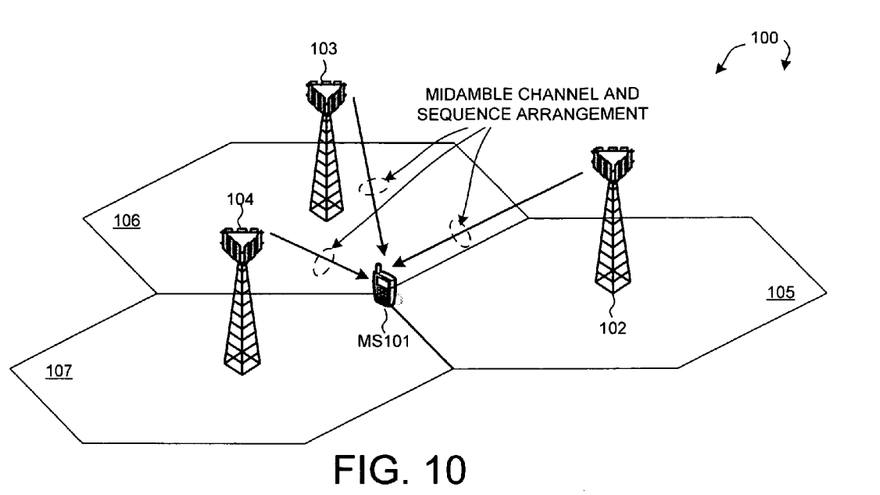
FIG. 10 illustrates a wireless OFDMA system with midamble channel and midamble sequence arrangement in accordance with one novel aspect.

FIG. 10 illustrates a wireless OFDMA system 100 with midamble channel and midamble sequence arrangement in accordance with one novel aspect. Wireless OFDMA system 100 comprises a mobile station MS101, and a plurality of base stations BS102, BS103, and BS104 serving a plurality of cells 105, 106, and 107 respectively. For DL channel estimation, BS102 transmits midamble signals to mobile station MS101 via a midamble channel allocated in one of the downlink subframes. The neighboring base stations BS103 and BS104 are dominant neighboring cells because they generate strong interference signals to MS101. To achieve interference randomization and provide robust midamble sequence detection, the midamble sequences used in different base stations are different in traditional IEEE 802.16e systems. For example, each base station is assigned with a unique midamble sequence based on its Cell ID. In the novel midamble channel and sequence arrangement of FIG. 10, however, the allocated midamble channel and selected midamble sequence of BS102 are arranged among different base stations in a way to achieve interference randomization with minimum required number of different code sequences. In addition, midamble sequences are generated by a systematic manner such that MS101 do not need to memorize all the different code sequences for midamble sequence detection.

Figure 11:
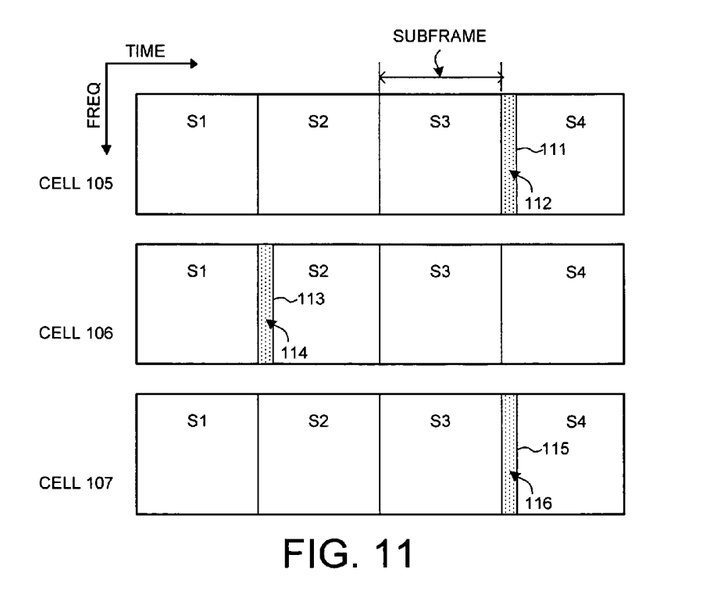
FIG. 11 illustrates an example of the novel midamble channel and sequence arrangement in the wireless OFDMA system of FIG. 10.

FIG. 11 illustrates an example of the novel midamble channel and sequence arrangement in wireless OFDMA system 100. In the example of FIG. 11, each DL frame contains four consecutive DL subframes S1-S4 along time domain. In cell 105, BS102 transmits a first plurality of midamble signals in midamble channel 111 allocated in S4. A midamble sequence 112 is mapped onto midamble channel 111. In cell 106, BS103 transmits a second plurality of midamble signals in midamble channel 113 allocated in S2. A midamble sequence 114 is mapped onto midamble channel 113. In cell 107, BS104 transmits a third plurality of midamble signals in midamble channel 115 allocated in S4. A midamble sequence 116 is mapped onto midamble channel 115. For BS102, both BS103 and BS104 are dominant neighboring cells that generate strong interference signals. Because midamble channel 113 is located in a different time-domain location from midamble channel 111, midamble sequence 112 can be the same as midamble sequence 114 without causing strong interference. On the other hand, because midamble channel 115 is located in the same time-domain location (with overlapping subcarriers) as midamble channel 111, midamble sequences 112 must be different from midamble sequence 116 to avoid strong interference. When different midamble sequences are transmitted to a mobile station, interference randomization can be achieved because the summation of other midamble sequences acts like a white noise with small power value after sequence matching.

Based on the illustrated example of FIG. 11, it can be seen that the number of different midamble sequences (i.e., P) required in OFDMA system 100 depends on the number of dominant neighboring cells (i.e., the number of cells causing strong interferences) and the number of time-domain locations (i.e., OFDM symbols) for midamble channel allocation in each frame. If the number of midamble locations is small and the number of strong interferences is large, then P should be large. Otherwise, if the number of midamble locations is large and the number of strong interferences is small, then P should be small. The number of strong interferences is typically chosen to be 256 in an OFDMA system. The number of midamble locations further depends on the number of subframes and frames, and the number of time-domain locations allowable for midamble allocation in each subframe. For example, if there are four DL subframes in each frame and each subframe is allowed for one midamble channel, then the number of midamble location is four in each frame. Therefore, in order to achieve interference randomization in a 256 strong interferences environment, the total number of required different midamble sequences P is equal to 256/4=64. By combining both code sequence and time-domain location degrees-of-freedom, the required number of midamble sequence is substantially smaller than the number of strong interferences.

Figure 12A:
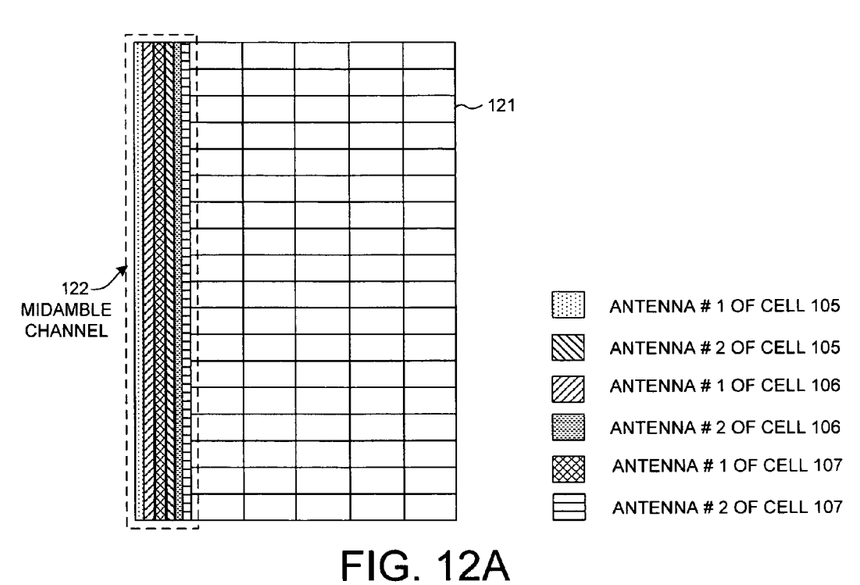
FIGS. 12A to 12B illustrate a midamble channel shared by different antennas of multiple base stations by CDM and/or FDM.
Figure 12B:
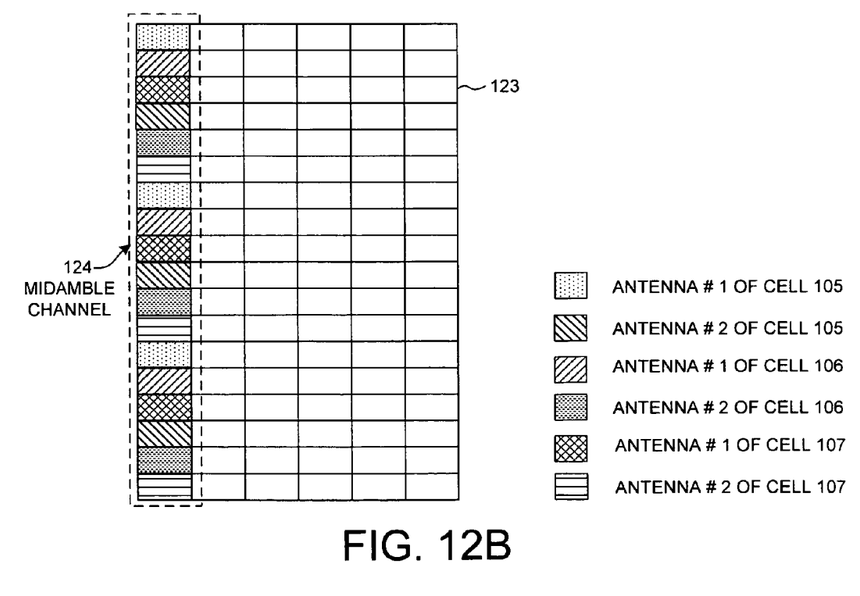

An allocated midamble channel may be further shared by different antennas of multiple base stations using a combination of Code Division Multiplexing (CDM) and/or Frequency Division Multiplexing (FDM). FIG. 12A illustrates that a midamble channel 122 allocated in resource block 121 is shared by antenna 1 and antenna 2 of BS102, BS103, and BS104 using CDM. In the example of FIG. 12A, each antenna of each base station maps a different midamble sequence onto midamble channel 122 for midamble transmission. FIG. 12B illustrates that a midamble channel 124 allocated in resource block 123 is shared by antenna 1 and antenna 2 of BS102, BS103, and BS104 using FDM. In the example of FIG. 12B, each antenna of each base station maps the same midamble sequence onto different non-overlapping parts of subcarriers within midamble channel 124 for midamble transmission.

In one novel aspect, in generating the P different midamble sequences, the same base code sequence may be used. For 2048 FFT size, a base sequence is a predefined length-2048 code sequence. For different FFT size, the corresponding base sequences can be obtained by truncating the longest code sequence. In a first embodiment, a code sequence is generated by cyclically shifting the base sequence. The number of bits to be shifted for each generated sequence by a base station might depend on the Cell_ID of the base station. For example, a code sequence b(k) might be generated under the following equation:

$$b_k = \begin{cases} 2.18(1 - (2G([k + u + \text{Offset}(FFTsize)]\text{mod}FFTsize))), \\ \qquad \text{where } k \neq \dfrac{Nused - 1}{2}, \\ (k - s)\text{mod}(3Nt) = 3g + \left(\left\lfloor \dfrac{\text{Cell\_ID}}{P} \right\rfloor + \left\lfloor \dfrac{k - s}{18N1} \right\rfloor\right)\text{mod}3 \\ 0, \quad \text{otherwise} \end{cases}$$

where (0<k<Nused−1) is the kth bit in the code sequence, u=(Cell_ID)mod(P) is the cyclic shift for different cells, offset(FFTsize) is the FFTsize specific offset, Nused is the length of the code sequence, Nt is the number of transmit antennas, g is a base station transmit antenna index ranging from 0 to Nt−1, G is the length-2048 base sequence, and s=0 for k<=(Nused−1)/2, and s=1 for k>(Nused−1)/2. In IEEE 802.16m systems, it is sufficient to set P=256.

In a second embodiment, a code sequence is generated by separation-and-combination (SC) operation on the base sequence. The SC rule for each generated sequence by a base station might depend on the Cell_ID of the base station. In a third embodiment, a code sequence is generated by pseudo-randomly interleaving the base sequence. The interleaving rule for each generated sequence by a base station might depend on the Cell_ID of the base station. By generating different code sequences from the same base sequence, the mobile station needs to memorize only one 2048-length code sequence. By plugging the cell ID of a base station into a midamble sequence generator, a unique code sequence is systematically generated for that base station.

In a wireless OFDMA system having a large number of cells, for each specific cell, the system ensures that other first-tier neighboring cells allocate midambles in different subframes or different parts of subcarriers by using interlacing feature. For second-tier neighboring cells, the system allows them to allocate midambles in the same subframes as those of first-tier cells, but ensure that they use different midamble sequences, which are obtained by rearranging (cyclically shifting, separation-and-combination, or pseudo-randomly interleaving) a well-designed random sequence. For outer-tier cells, the system allow them to allocate midambles in the same subframes as those of their previous-tier cells, but ensures that the use different midamble sequences with different rearrangement factors.

Figure 13:
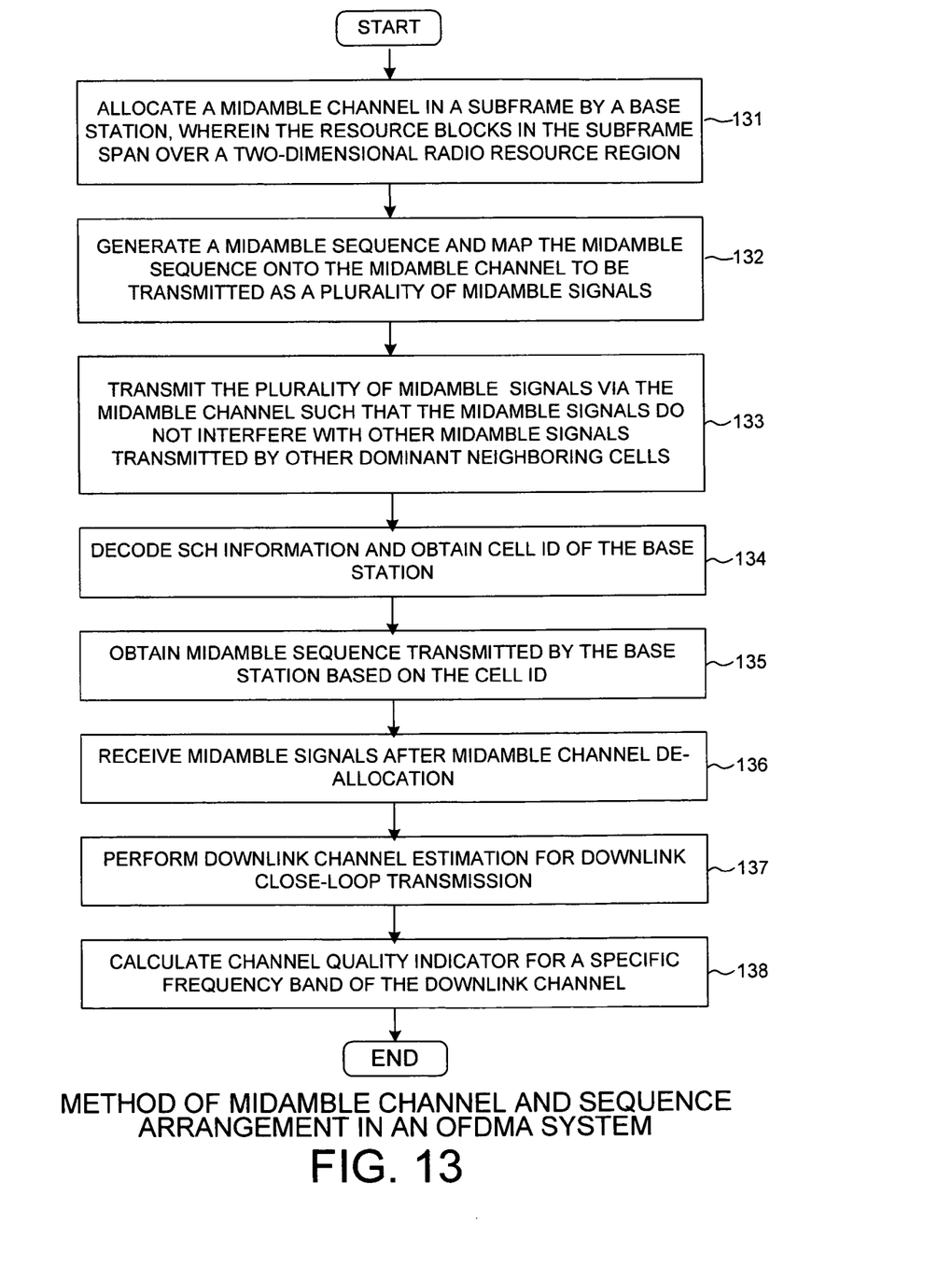
FIG. 13 is a flow chart of a method of downlink midamble channel and sequence arrangement in an OFDMA system in accordance with one novel aspect.

FIG. 13 is a flow chart of a method of downlink midamble channel and sequence arrangement in an OFDMA system in accordance with one novel aspect. From a base station perspective, in step 131, the base station allocates a physical midamble channel structure in a time-domain location (i.e., the first OFDM symbol) of a DL subframe. In step 132, the base station generates a midamble sequence and maps the midamble sequence onto the allocated midamble channel to be transmitted as a plurality of midamble signals via the DL subframe. In step 133, the base station transmits the plurality of midamble signals to a mobile station. The midamble channel and sequence are arranged such that the plurality of midamble signals does not interfere with other midamble signals transmitted by other dominant neighboring cells in the OFDMA system. Both code sequence and either time-domain location or frequency-domain location degrees-of-freedom are combined such that the number of different midamble sequences required in the OFDMA system is substantially less than the number of dominant neighboring cells. In addition, code sequences are systematically generated based on the same base sequence to reduce mobile station complexity. From the mobile station perspective, in step 134, the mobile station first receives synchronization channel (SCH) information broadcasted by the base station and obtains the cell ID of the base station by decoding the SCH information. Based on the cell ID, the mobile station is able to obtain the corresponding midamble sequence transmitted by the base station (i.e., by cyclically shifting a base sequence) (step 135). After midamble channel de-allocation, the mobile station receives the midamble signals transmitted via the allocated midamble channel by the base station (step 136). The mobile station then uses the obtained midamble sequence to match the received midamble signals to perform DL channel estimation (Step 137). For example, the mobile station can use channel knowledge to choose the best precoding vector/matrix and then feedback the information to the base station. In addition, the mobile station can use the channel information to calculate channel quality indicator (CQI) for a specific frequency band of the downlink channel (step 138).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for providing a midamble channel in an orthogonal frequency division multiple access (OFDMA) system, the method comprising:
   allocating the midamble channel in a subframe having multiple resource blocks by a base station, wherein the resource blocks span over a two-dimensional radio resource region having an array of subcarriers along frequency domain and an array of OFDM symbols along time domain, wherein the midamble channel is allocated to be shared among different transmit antennas; and
   transmitting midamble signals via the midamble channel for such that the midamble signals occupy a single OFDM symbol within the subframe, wherein the midamble channel is allocated either in the first OFDM symbol or in the last OFDM symbol of the resource blocks of the subframe, wherein the remaining consecutive OFDM symbols of the same resource blocks are applied with Space Frequency Block Coding (SFBC) for data transmission, and
   wherein the midamble signals are transmitted for facilitation to calculate a channel quality indicator for a frequency band of a downlink channel.

2. The method of claim 1, wherein the resource blocks are six-symbol resource blocks, and wherein the remaining five consecutive symbols in each of the resource blocks are formed to be a five-symbol resource block for data transmission.

3. The method of claim 1, wherein the resource blocks are seven-symbol resource blocks, and wherein the remaining six consecutive symbols in each of the resource blocks are formed to be a six-symbol resource block for data transmission.

4. The method of claim 1, wherein pilot signals are mapped onto IEEE 802.16m predefined pilot patterns, and wherein the midamble signals do not collide with the pilot signals transmitted in the same resource blocks.

5. The method of claim 1, wherein Space Frequency Block Coding (SFBC) is applied in the same resource blocks for data transmission, and wherein the midamble signals do not limit the SFBC-based data transmissions.

6. The method of claim 1, wherein the midamble channel is shared among different transmit antennas of multiple base stations by at least one of code division multiplexing (CDM), frequency division multiplexing (FDM), and time division multiplexing (TDM).

7. The method of claim 1, wherein multiple midamble channels are allocated in multiple downlink subframes to provide multiple midamble opportunities for different transmit antennas of multiple base stations.

8. The method of claim 1, wherein a midamble pattern remains the same among different multiple-input multiple-output (MIMO) schemes within each resource block.

9. The method of claim 1, wherein the midamble signals and data signals do not co-exist in an OFDM symbol such that the base station determines midamble power boost to minimize Peak-to-Average Power Ratio (PAPR) for the first or the last OFDM symbol.

10. A base station in an OFDMA system, the base station comprising:
   a midamble channel allocation module for allocating a midamble channel in a subframe having multiple resource blocks that span over a two-dimensional radio resource region having an array of subcarriers along frequency domain and an array of OFDM symbols along time domain, wherein the midamble channel is allocated to be shared among different transmit antennas; and
   transmitting midamble signals via the midamble channel to, wherein the midamble channel is allocated either in the first OFDM symbol or in the last OFDM symbol of the resource blocks of the subframe, and wherein the remaining consecutive OFDM symbols of the same resource blocks are applied with Space Frequency Block Coding (SFBC) used for data transmission, and
   wherein the midamble signals are transmitted for facilitation to calculate a channel quality indicator for a frequency band of a downlink channel.

11. The base station of claim 10, wherein the resource blocks are six-symbol resource blocks, and wherein the remaining five consecutive symbols in each of the resource blocks are formed to be a five-symbol resource block for data transmission.

12. The base station of claim 10, wherein the resource blocks are seven-symbol resource blocks, and wherein the remaining six consecutive symbols in each of the resource blocks are formed to be a six-symbol resource block for data transmission.

13. The base station of claim 10, wherein the midamble channel is shared among different transmit antennas of multiple base stations by at least one of code division multiplexing (CDM), frequency division multiplexing (FDM), and time division multiplexing (TDM).

14. The base station of claim 10, wherein multiple midamble channels are allocated in multiple downlink subframes to provide multiple midamble opportunities for different transmit antennas of multiple base stations.

15. The base station of claim 10, wherein pilot signals are mapped onto IEEE 802.16m predefined pilot patterns, and wherein the midamble signals do not collide with the pilot signals transmitted in the same resource blocks.

16. The base station of claim 10, wherein Space Frequency Block Coding (SFBC) is applied in the same resource blocks for data transmission, and wherein the midamble signals do not limit the SFBC-based data transmissions.

17. The base station of claim 10, wherein a midamble pattern remains the same among different multiple-input multiple-output (MIMO) schemes within each resource block.

18. The base station of claim 10, wherein the midamble signals and data signals do not co-exist in an OFDM symbol such that the base station determines midamble power boost to minimize Peak-to-Average Power Ratio (PAPR) for the first or the last OFDM symbol.

* * * * *